(12) United States Patent
Wu et al.

(10) Patent No.: US 11,698,493 B2
(45) Date of Patent: Jul. 11, 2023

(54) SINGLE-ENDED OUTPUT CIRCULATOR

(71) Applicant: II-VI Delaware, Inc, Wilmington, DE (US)

(72) Inventors: Li Wu, Fujian (CN); Yunbing Xu, Fujian (CN); Weimin Chen, Fujian (CN); Yuping Wu, Fuzhou (CN); Danping Wei, Fujian (CN); Peng Xiao, Fuzhou (CN); Yang Li, Fuzhou (CN); Hongming Cai, Fujian (CN)

(73) Assignee: II-VI DELAWARE, INC., Wilmington, DE (US)

( * ) Notice: Subject to any disclaimer, the term of this patent is extended or adjusted under 35 U.S.C. 154(b) by 42 days.

(21) Appl. No.: 17/204,768

(22) Filed: Mar. 17, 2021

(65) Prior Publication Data

US 2021/0294037 A1 Sep. 23, 2021

(30) Foreign Application Priority Data

Mar. 18, 2020 (CN) .......................... 202010191575.1

(51) Int. Cl.
*G02B 6/293* (2006.01)
*G02B 6/27* (2006.01)
*F21V 8/00* (2006.01)
*G02B 6/12* (2006.01)
*G02B 6/10* (2006.01)

(52) U.S. Cl.
CPC ......... *G02B 6/29322* (2013.01); *G02B 6/002* (2013.01); *G02B 6/105* (2013.01); *G02B 6/12* (2013.01); *G02B 6/272* (2013.01); *G02B 6/2766* (2013.01); *G02B 6/2932* (2013.01); *G02B 2006/12116* (2013.01)

(58) Field of Classification Search
None
See application file for complete search history.

(56) References Cited

U.S. PATENT DOCUMENTS

| 2002/0186914 A1* | 12/2002 | Li | G02B 6/272 |
| | | | 385/11 |
| 2013/0202297 A1* | 8/2013 | Martinelli | G02B 6/3512 |
| | | | 398/49 |

FOREIGN PATENT DOCUMENTS

WO  WO-2012088361 A2 *  6/2012  ............. G02B 27/30

* cited by examiner

*Primary Examiner* — Chad H Smith
(74) *Attorney, Agent, or Firm* — Blank Rome LLP

(57) ABSTRACT

A single-ended output circulator includes a three-core optical fiber head having first, second, and third optical fiber cores; a walk-off crystal having a first surface facing towards the second end of the three-core optical fiber head tube and a second surface facing away from the second end of the three-core optical fiber head tube; a plurality of half-wave plates each having a first surface coupled to the second surface of the walk-off crystal and a second surface facing away from the second surface of the walk-off crystal; a collimating lens having a first end and a second end; a reflection mirror configured to reflect light beams from the collimating lens; an optical prism between the collimating lens and the reflection mirror and configured to transmit a light beam along a propagation direction according to a polarization direction of the light beam; and a polarization rotator.

21 Claims, 7 Drawing Sheets

SINGLE-ENDED OUTPUT CIRCULATOR

CROSS-REFERENCE TO RELATED APPLICATIONS

This application claims priority to Chinese Patent Application No. 202010191575.1 filed on Mar. 18, 2020, the content of which is relied upon and incorporated herein by reference in its entirety.

TECHNICAL FIELD

The present invention relates to the field of optical fiber communication devices, and in particular to a single-ended output circulator.

BACKGROUND

With the increasing development of the optical communication industry, consumers are increasingly expecting black technologies. For components, miniaturization and high performance are the expected development directions. At the same time, there are also more expectations on the functional tunability of components. However, the existing single-ended output circulators have the problems of large volume, unstable optical performance, inconvenient processing, and difficult packaging.

SUMMARY

The objective of the solution of the present disclosure is directed toward providing a single-ended output circulator with good optical performance, low cost, small size, and simplified structure.

In order to achieve the above technical objective, the technical solution adopted by the present disclosure includes a single-ended output circulator. The single-ended output circulator includes a first connecting tube; a three-core optical fiber head (i.e., three-fiber pigtail) having one end penetrating into a first end of the first connecting tube, and having there fibers (e.g., three fiber cores) for transmitting one or more optical signals; a collimating lens having a first end penetrating into a second end of the first connecting tube; a walk-off crystal disposed in the first connecting tube and between the three-core optical fiber head and the collimating lens, and configured to receive the optical signals emitted from the three-core optical fiber or transmit the optical signals to the corresponding core of the three-core optical fiber head, a magneto-optical crystal disposed between the walk-off crystal and the collimating lens or on one side of the collimating lens away from the walk-off crystal; a second connecting tube having a first end spherically fitted or matched with the second end of the first connecting tube and causing a second end of the collimating lens to be nested therein; a total reflection mirror disposed at a second end of the second connecting tube and configured to reflect the optical signal emitted by the collimating lens; and an optical prism disposed between the collimating lens and the total reflection mirror, where one end surface of the walk-off crystal away from the three-core optical fiber head is provided with wave plates in one-to-one correspondence with the three cores of the three-core optical fiber head.

As an example implementation, further, the optical prism is a Wollaston prism, a Rochon prism, or a crystal wedge prism.

In some example implementations, the magneto-optical crystal is disposed on one side of the collimating lens away from the walk-off crystal, and the magneto-optical crystal is located between the optical prism and the collimating lens.

In certain example implementations, further, the magneto-optical crystal is a latching Faraday rotator.

In another example implementation, further, the magneto-optical crystal is provided with a magnetic ring on its circumference.

In some example implementations, the magnetic ring is disposed surrounding the magneto-optical crystal.

In certain example implementations, the magneto-optical crystal is disposed on one side of the collimating lens away from the walk-off crystal, and the second connecting tube is a magnetic ring.

In another example implementation, further, the three cores of the three-core optical fiber head are disposed side by side.

In some example implementations, further, the walk-off crystal and the wave plates are sequentially attached to an end portion of the three-core optical fiber head.

In certain example implementations, further, the optical prism is attached to a second end of the collimating lens.

By adopting the above-described technical schemes, as compared with the existing technologies, the present disclosure has, e.g., the following beneficial effects. The technical schemes of the present disclosure may utilize a tubular structure, through cooperation or combination of a three-core optical fiber head, a collimating lens, a magneto-optical crystal, an optical prism, a walk-off crystal, and a total reflection mirror, optical signals input and output of the three-core optical fiber head are transmitted at a same single end of an apparatus, so that the apparatus is more miniaturized and compact, and at the same time, it can ensure that the apparatus has better optical performance.

BRIEF DESCRIPTION OF THE DRAWINGS

The present disclosure will be further described below with reference to accompanying drawings and specific implementations.

DETAILED DESCRIPTION

Figure 1A:
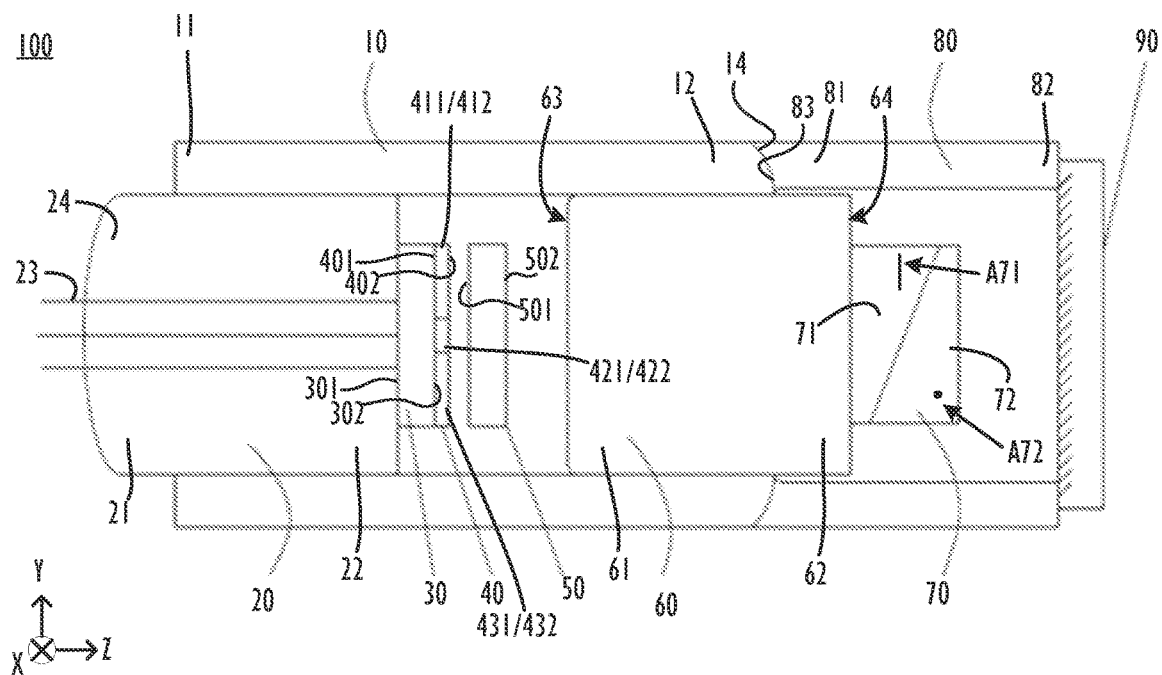
FIGS. 1A-1B are schematic side views of a single-ended output circulator according to the present disclosure.
Figure 1B:
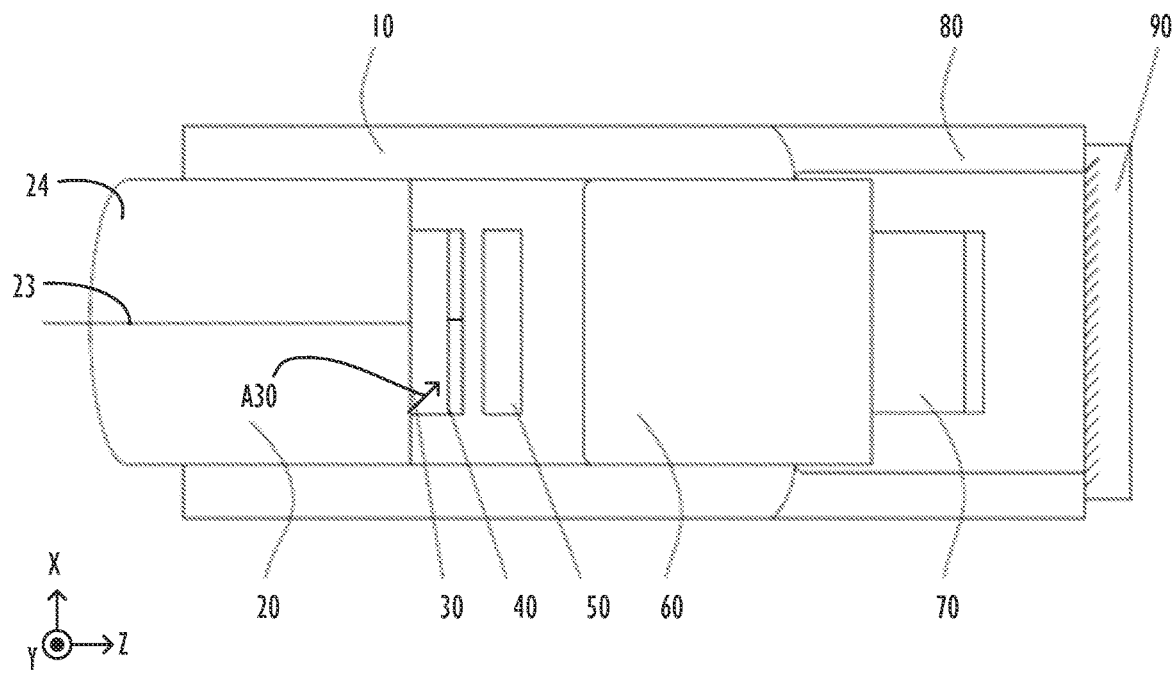

FIGS. 1A-1B are schematic side views of a single-ended output circulator 100 according to the present disclosure. As shown in FIGS. 1A-1B, the single-ended output circulator 100 consistent with the present disclosure includes a first connecting tube 10, a three-core optical fiber head 20 (i.e., a three-optical-fiber-core pigtail), a walk-off crystal 30, wave plates 40, a magneto-optical crystal 50, a collimating lens 60, an optical prism 70, a second connecting tube 80, and a total reflection mirror 90. FIGS. 1A to 1B, as well as other figures disclosed herein, also show a coordinate system having X, Y, and Z axes. X axis is perpendicular to Y axis, and Z axis is perpendicular to the X-Y plane. Z axis may serve as (or is parallel to) a longitudinal axis of first connecting tube 10.

FIG. 1A shows the single-ended output circulator 100 viewed along +X direction, and FIG. 1B shows the single-ended output circulator 100 viewed along −Y direction. The three-core optical fiber head 20 has a first end 21 and a second end 22. The second end 22 penetrates into a first end 11 of the first connecting tube 10. The head 20 includes three optical fibers 23 (e.g., three optical fiber cores) for transmitting optical signals.

The head 20 may further include a glass structure 24 for positioning the three optical fibers 23. In some examples, the glass structure 24 may have three holes (e.g., capillary holes) each with a circular cross-section for positioning a respective one of the three optical fibers 23 therein, and the three optical fibers 23 pass through the three holes respectively. In other examples, the glass structure 24 may have a hole with an oval-shaped cross-section, and the three optical fibers 23 pass through the hole having the oval-shaped cross-section.

The collimating lens 60 has a first end 61 penetrating into the second end 12 of the first connecting tube 10. The walk-off crystal 30 is disposed in the first connecting tube 10 and is disposed between three-core optical fiber head 20 and the collimating lens 60. The walk-off crystal 30 is configured to receive the optical signals emitted or incoming from three-core optical fiber head 20 and/or is configured to transmit the optical signals to the corresponding cores of the three-core optical fiber head 20. The walk-off crystal 30 may be, for example, a YVO4 crystal. The walk-off crystal 30 may have an optical axis A30 (e.g., in FIG. 1B) parallel to the X-Z plane, and an angle between the optical axis A30 of the walk-off crystal 30 and a longitudinal axis of the walk-off crystal 30 that is parallel to Z axis may have, for example, a value in a range of 45 to 48 degrees.

The second connecting tube 80 may have a first end 81 spherically fitted or matched with the second end 12 of first connecting tube 10, and the tube 80 may nest or surround the second end 62 of the collimating lens 60. For example, a first end 81 of the second connecting tube 80 may have a spherical first end surface 83, and the second end 12 of first connecting tube 10 may have a spherical second end surface 14 that matches with the spherical first end surface 83. The spherical first end surface 83 of the second connecting tube 80 may be adjusted to be matched with the spherical second end surface 14 of first connecting tube 10, such that the total reflection mirror 90 is tuned or oriented to reflect the optical signals from collimating lens 60 as needed.

A glue or adhesive may be applied for coupling the second connecting tube 80 to the first connecting tube 10. With the spherical first end surface 83 of the second connecting tube 80 being matched with the spherical second end surface 14 of first connecting tube 10 and the total reflection mirror 90 being tuned or oriented, the glue or adhesive may be cured to fix the second connecting tube 80 to the first connecting tube 10.

Total reflection mirror 90 is disposed at a second end 82 of the second connecting tube 80 and configured to reflect the optical signal emitted by or coming from collimating lens 60. In some examples, a cross-sections of first connecting tube 10 across X-Y plane may include a circular shape, an annular shape, or any other suitable shape, and a cross-sections of second connecting tube 80 across X-Y plane may include a circular shape, an annular shape, or any other suitable shape. A material of the first connecting tube 10 may include glass or any other suitable materials. A material of the second connecting tube 20 may include glass or any other suitable materials.

The optical prism 70 is disposed between the collimating lens 60 and the total reflection mirror 90. In some examples, the magneto-optical crystal 50 is disposed between the walk-off crystal 30 and collimating lens 60, but the magneto-optical crystal 50 is not limited to this position. In other examples, the collimating lens 60 has a first side 63 facing towards the walk-off crystal 30 and a second side 64 facing away from walk-off crystal 30, and the magneto-optical crystal 50 may be disposed on the second side 64 of collimating lens 60 facing away from walk-off crystal 30, e.g., the second side 64 corresponding to the second end 62 of the collimating lens 60.

In certain examples, the magneto-optical crystal 50 is disposed on the second side 64 of the collimating lens 60 facing away from walk-off crystal 30, and the magneto-optical crystal 50 is positioned between optical prism 70 and collimating lens 60. The magneto-optical crystal 50 may have a first side 501 facing towards the three-core optical fiber head 20 and a second side 502 facing away from the three-core optical fiber head 20. The magneto-optical crystal 50 may be, for example, a Faraday rotator. The magneto-optical crystal 50 may be attached to adjacent components (e.g., wave plates 40, collimating lens 60, optical prism 70, first connecting tube 10, second connecting tube 80) via a glue/adhesive and/or any other coupling suitable structures or materials according to various application scenarios.

In some examples, the walk-off crystal 30 has a first end surface 301 facing toward three-core optical fiber head 20 and a second end surface 302 facing away from three-core optical fiber head 20, and the second end surface 302 of the walk-off crystal 30 facing away from the three-core optical fiber is provided with wave plates 40 corresponding to the three fiber cores 23 of three-core optical fiber head 20, e.g., in one-to-one correspondence with the three fiber cores 23 of three-core optical fiber head 20. For example, each of three rows of wave plates 40 is in correspondence with a respective one of the three fiber cores 23 of three-core optical fiber head 20.

Figure 2A:
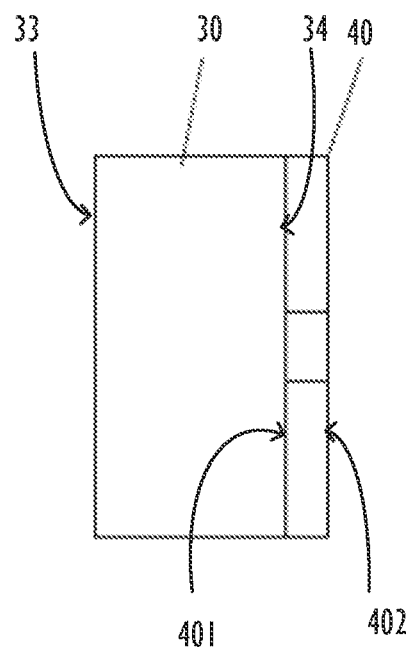
FIG. 2A is a side view of wave plates disposed on a walk-off crystal.
Figure 2B:
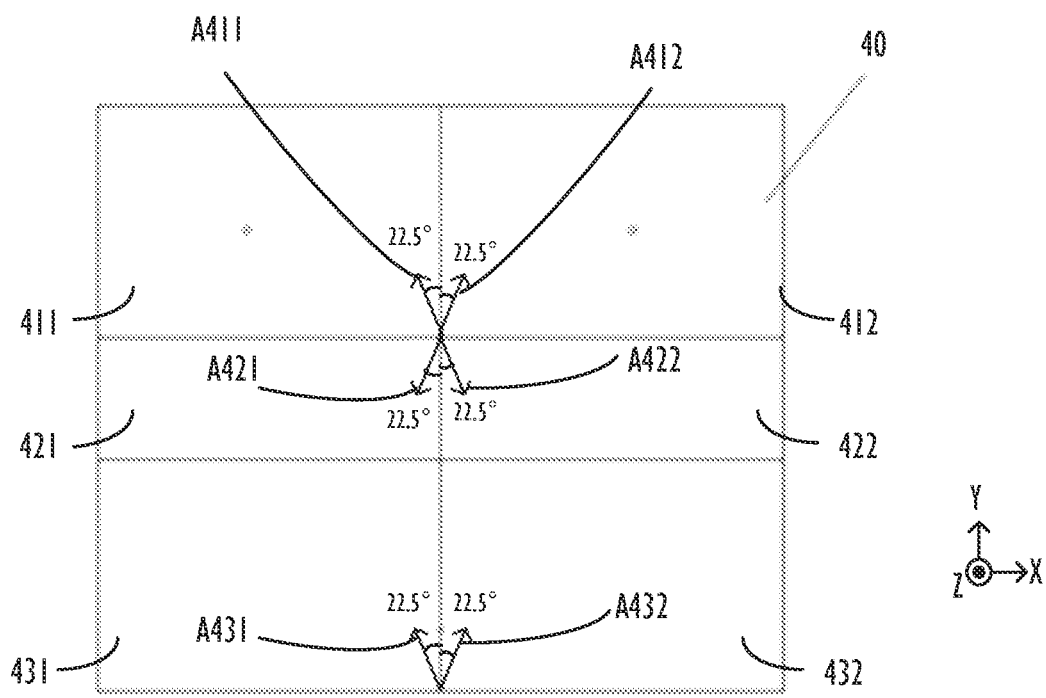
FIG. 2B is a front view of the wave plates.

During operation of the circulator 100, the walk-off crystal 30 is a displacement-type birefringent crystal that produces a "walk-off effect" that refracts a light beam with birefringence based on the polarization and propagation direction of the light beam. The walk-off crystal 30 can split/combine o-light (i.e., ordinary ray) and e-light (i.e., extraordinary ray) inside the crystal 30. In turn, the waveplates 40 are configured to shift (e.g. rotate, change, or tune) a polarization direction of a linear polarized light beam passing through the circulator 100. Further details of the waveplates 40 are shown in FIG. 2A, which is a side view of wave plates 40 disposed on the walk-off crystal 30, and are shown in FIG. 2B, which is a front view of the wave plates 40. As shown in the side view of FIG. 2A, the wave plates 40 are disposed on the walk-off crystal 30. The wave plates 40 may be attached to the walk-off crystal 30 via, e.g., adhesives or glues. The first surfaces 401 of the wave plates 40 may be attached to the second end surface 302 of the walk-off crystal 30.

As shown in FIGS. 1A-1B and 2A-2B, a first row of wave plates 40 include wave plates 411 and 412, a second row of wave plates 40 include wave plates 421 and 422, and a third row of wave plates 40 include wave plates 431 and 432. Each wave plate 40 may have a first surface 401 facing towards the three-core optical fiber head 20 and a second surface 402 facing away from the three-core optical fiber head 20. Each wave plate 40 may be a half-wave plate (HWP) configure to rotate, change, or tune a polarization direction of a linear polarized light beam.

In the example of FIG. 2B, angles below an optical axis (denoted by arrows) and an edge of each wave plate 40 may be 22.5 degrees. For example, viewing along −Z direction, the optical axis A411 of wave plate 411 is 22.5 degrees counter-clockwise from the edge of wave plate 411 that is along +Y direction; the optical axis A412 of wave plate 412 is 22.5 degrees clockwise from the edge of wave plate 412 that is along +Y direction; the optical axis A421 of wave plate 421 is 22.5 degrees clockwise from the edge of wave plate 421 that is along −Y direction; the optical axis A422 of wave plate 422 is 22.5 degrees counter-clockwise from the edge of wave plate 422 that is along −Y direction; the optical axis A431 of wave plate 431 is 22.5 degrees counter-clockwise from the edge of wave plate 431 that is along +Y direction; and the optical axis A432 of wave plate 432 is 22.5 degrees clockwise from the edge of wave plate 432 that is along +Y direction.

Figure 3A:
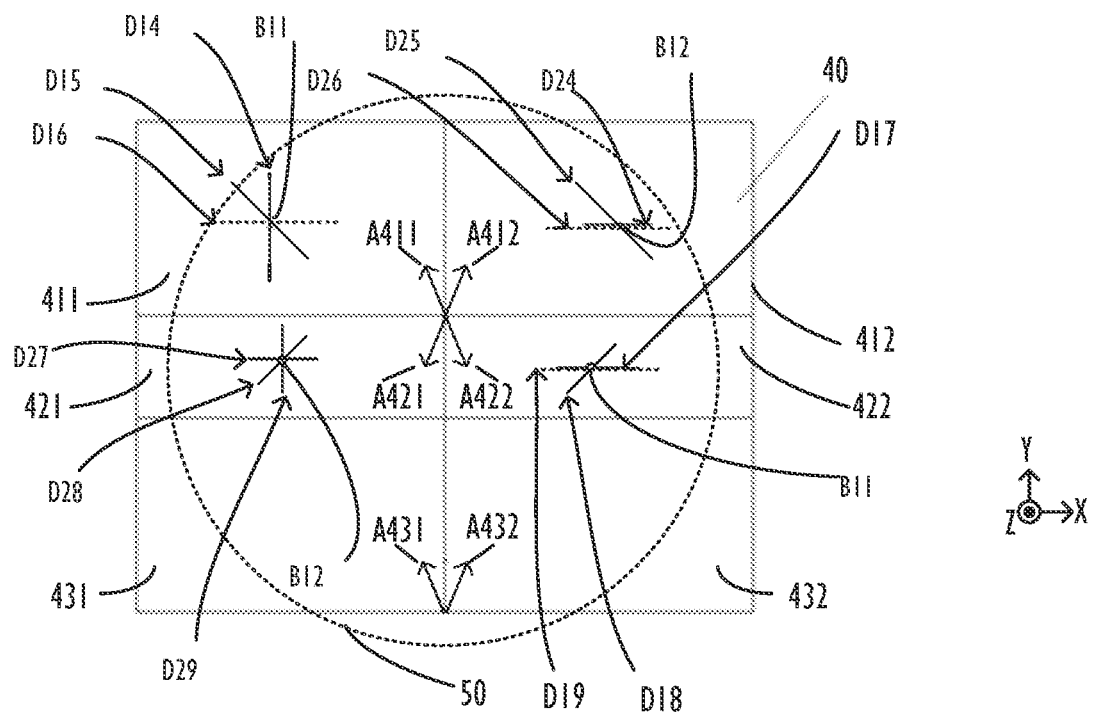
FIGS. 3A-3B illustrate polarizations for light beams being transmitted in the single-ended output circulator.
Figure 3B:
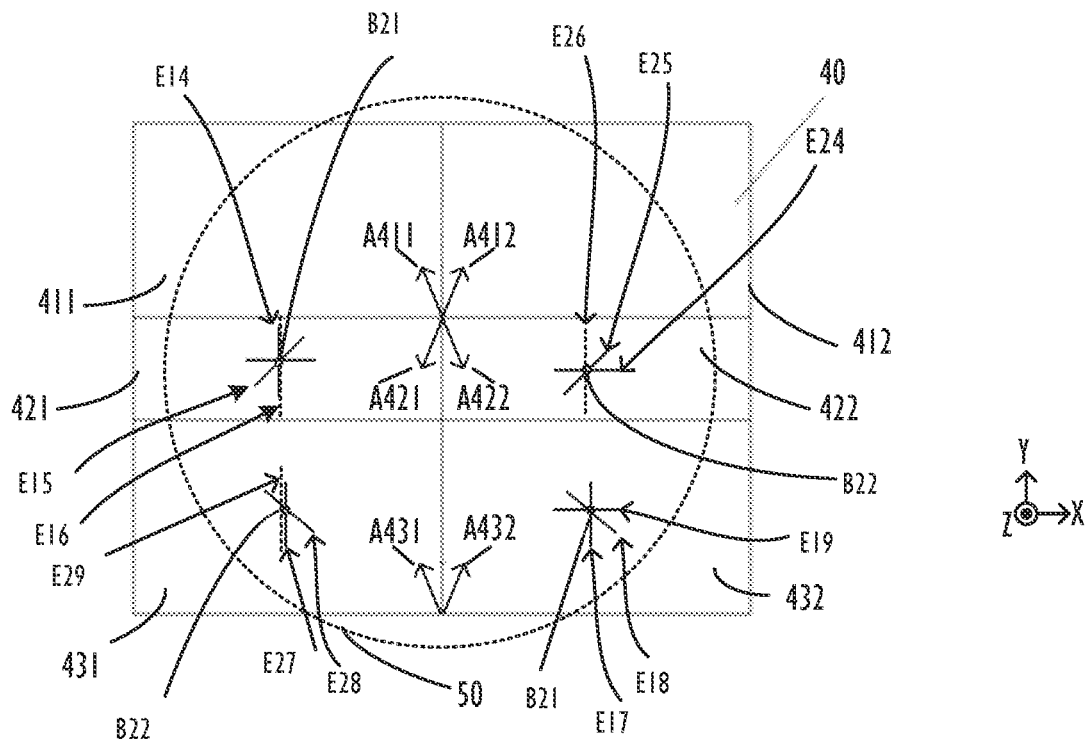

Even further details of the wave plates 40 are shown in FIGS. 3A-3B, which are front views of the wave plates 40 showing how light beams being transmitted therethrough are polarized. In these figures, reference numerals indicated with "A" refer to optical axes; reference numerals indicated with "B" refer to light beams; reference numerals indicated with "D" refer to polarization directions for light beams of optical signal input from port 1 and then output from port 2; and reference numerals indicated with "E" refers to polarization directions for light beams of optical signal input from port 2 and then output from port 3.

Having a general understanding of the single-ended output circulator 100, the walk-off crystal 30, and the wave plates 40, discussion now turns to how the disclosed circulator 100 routes light beams along optical paths according to the present disclosure. FIGS. 4A to 5C illustrate optical paths of the single-ended output circulator 100 shown in FIGS. 1A-1B from various viewing angles. Reference to the wave plates 40, angles, beams, polarization directions, and the like mentioned previously in FIGS. 2A-2B and 3A-3B are also made.

FIGS. 3A-3B, 4A-4C, and 5A-5C illustrate schematic diagrams of optical paths of the structure shown in FIGS. 1A-1B according to various embodiments of present disclosure. In FIGS. 4A-4C and 3A, an optical signal input from port 1 is returned and then output from port 2. In FIGS. 5A-5C and 3B, an optical signal input from port 2 is returned and then output from port 3.

Figure 4A:
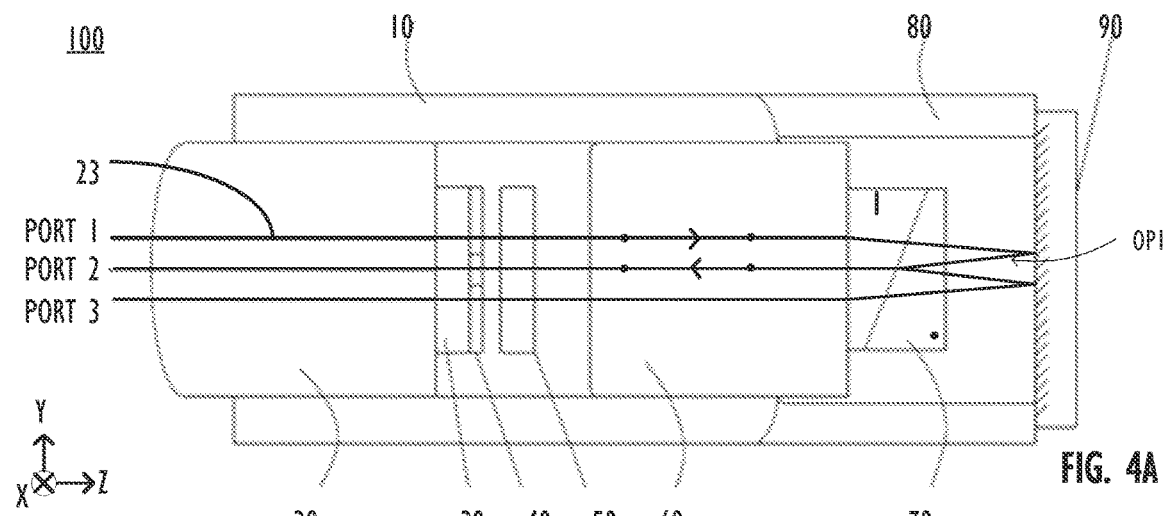
FIGS. 4A-4C illustrate an example of first optical paths of the single-ended output circulator shown in FIGS. 1A-1B from various viewing angles.
Figure 4B:
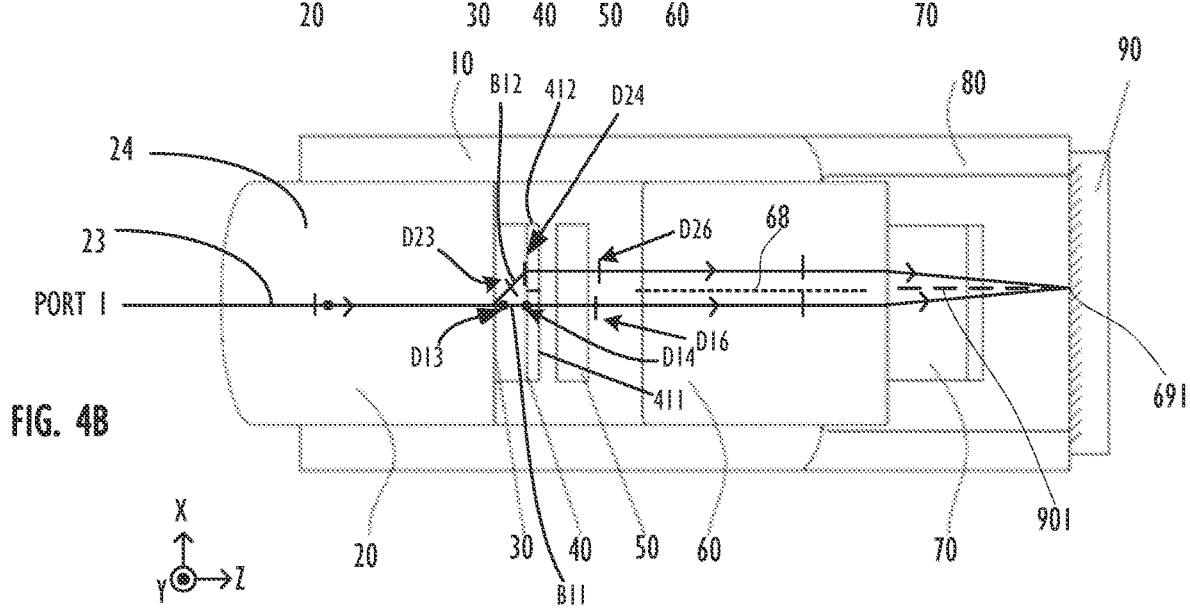
Figure 4C:
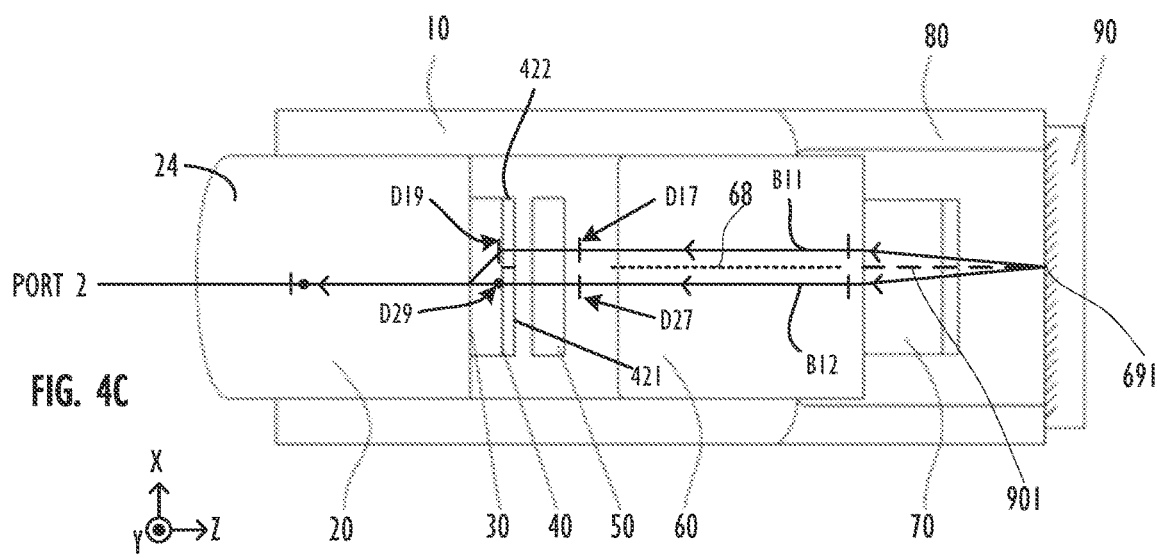

With reference to FIGS. 4A-4C and 3A, light/optical paths of a light beam input from port 1 and output from port 2 are described. FIG. 4B illustrates light/optical paths of light beams from port 1 towards the reflection mirror 90; and FIG. 4C illustrates light/optical paths of reflected light beams from the reflection mirror 90 towards port 2. A light beam enters port 1 and is transmitted to the walk-off crystal 30 via an optical fiber core 23 corresponding to port 1. The light beam is split into light beam B11 (e.g., ordinary ray) having a polarization direction D13 that is parallel to Y axis and perpendicular to X-Z plane, denoted by a dot in FIG. 4B, and another light beam B12 (e.g., extraordinary ray) having a polarization direction D23 that is parallel to X-Z plane.

Upon entering the first surface 401 of wave plate 411 from the walk-off crystal 30, light beam B11 has a polarization direction D14 parallel to Y axis and perpendicular to X-Z plane. Upon entering the first surface 401 of wave plate 412 from the walk-off crystal 30, light beam B12 has a polarization direction D24 parallel to X axis and perpendicular to Y-Z plane. The wave plate 411 may be configured to rotate or change the polarization direction D14 of light beam B11 to polarization direction D15 (e.g., in FIG. 3A), as light beam B11 is transmitted from the first surface 401 to the second surface 402 of wave plate 411. The polarization direction D15 may be 45 degrees counter-clockwise from +Y direction as viewing along −Z direction, and the polarization directions D14 and D15 may be symmetrical with respect to the optical axis A411.

The wave plate 412 may be configured to rotate or change polarization direction D24 to polarization direction D25, as light beam B12 is transmitted from the first surface 401 to the second surface 402 of wave plate 412. Polarization direction D25 may be 45 degrees counter-clockwise from +Y direction as viewing along −Z direction, and polarization directions D24 and D25 may be symmetrical with respect to the optical axis A412. Further, polarization direction D25 of light beam B12 may be parallel to polarization direction D15 of light beam B11. The wave plates 411 and 412 may be configured to cause the polarization directions of light beams B11 and B12 to be same or parallel.

The magneto-optical crystal 50 may be configured to rotate or change polarization direction D15 of light beam B11 to polarization direction D16, e.g., to rotate polarization direction of light beam B11 by 45 degrees counter-clockwise as viewing along −Z direction, as light beam B11 is transmitted from the first side 501 to the second side 502 of the magneto-optical crystal 50. Polarization direction D15 may be parallel to X axis. Further, the magneto-optical crystal 50 may be configured to rotate or change polarization direction D25 of light beam B12 to polarization direction D26, e.g., rotating the polarization direction of light beam B12 by 45 degrees counter-clockwise as viewing along −Z direction, as light beam B12 is transmitted from the first side 501 to the second side 502 of the magneto-optical crystal 50. Polarization direction D25 of light beam B12 may be parallel to X axis, and be parallel to polarization direction D15 of light beam B11. The magneto-optical crystal 50 may be configured to cause the polarization directions of light beams B11 and B12 to be parallel to X axis.

Further, light beams B11 and B12 from the magneto-optical crystal 50 may pass through the collimating lens 60. The collimating lens 60 may be configured to perform focusing and/or collimation on the light beams B11 and B12.

The light beams B11 and B12 may pass through the optical prism 70, and further irradiate to the total reflection mirror 90 and be reflected by the total reflection mirror 90. The collimating lens 60 may have a central axis (or a longitudinal axis) 68. Light beams B11 and B12 may be focused to a point 691 (e.g., a focus point of collimating lens 60) on the total reflection mirror 90. The total reflection mirror 90 may have a normal line 901 that is perpendicular to the reflection surface of the total reflection mirror 90. In certain examples, the total reflection mirror 90 (together with the second connecting tube 80) may be oriented, such that an angle between the normal line 901 and light beam B11 is equal to an angle between the normal line 901 and light beam B12 viewing along −Y direction, when the light beams B11 and B12 irradiate from the collimating lens 60 to the total reflection mirror 90. For example, an orthogonal projection of the normal line 901 on X-Z plane may bisect orthogonal projections of light beams B11 and B12 on X-Z plane, when the light beams B11 and B12 irradiate from the collimating lens 60 to the total reflection mirror 90.

In some examples, when the light beams B11 and B12 irradiate from the collimating lens 60 to the total reflection mirror 90, the central axis 68 of the collimating lens 60 may be between the light beams B11 and B12 along X axis. Further, the total reflection mirror 90 may be oriented, such that an angle between the normal line 901 and light beam B11 is equal to an angle between the normal line 901 and light beam B12 viewing along −Y direction, when the light beams B11 and B12 irradiate from the collimating lens 60 to the total reflection mirror 90. An orthogonal projection of the normal line 901 on the X-Z plane may be parallel to or tilted with respect to an orthogonal projection of the central axis 68 on the X-Z plane according to location relationships of the central axis 68 and the light beams B11 and B12.

In other examples, by arranging the locations of ports and optical fiber cores, the light beam B11 may irradiate to the total reflection mirror 90 in a path having the same X value as the central axis 68 of the collimating lens 60, and the total reflection mirror 90 may be tilted, such that an angle between the normal line 901 and light beam B11 is equal to an angle between the normal line 901 and light beam B12 viewing along −Y direction, when the light beams B11 and B12 irradiate from the collimating lens 60 to the total reflection mirror 90. The total reflection mirror 90 may be tilted by tiling or rotating the second connecting tube 80 around Y axis; and accordingly an orthogonal projection of the normal line 901 on the X-Z plane may be tilted with respect to an orthogonal projection of the central axis 68 on the X-Z plane.

Referring to FIGS. 4A, 4C, and 3A, reflected light beams B11 and B12 return to the optical prism 70. As the light beams B11 and B12 are transmitted between the total reflection mirror 90 and the optical prism 70, the polarization directions of the light beams B11 and B12 may be parallel to X-Z plane, and be perpendicular to the propagation directions of the light beams B11 and B12, respectively.

In the return paths, as light beams B11 and B12 reflected from the total reflection mirror 90 are transmitted through the optical prism 70, propagation directions of light beams B11 and B12 may be changed or adjusted, such that propagation directions of light beams B11 and B12 are parallel to X-Z plane (e.g., FIG. 4A). When passing through the collimating lens 60, light beams B11 and B12 may be collimated by the collimating lens 60, such that the propagation directions of light beams B11 and B12 may be parallel to each other and parallel to Z axis. Further, polarization direction D17 of the light beams B11 is parallel to polarization direction D27 of the light beams B12, and polarization directions D17 and D27 are parallel to X axis, e.g., at the second side 502 of the magneto-optical crystal 50.

The magneto-optical crystal 50 may be configured to rotate or change polarization direction D17 of light beam B11 to polarization direction D18, e.g., to rotate polarization direction of light beam B11 by 45 degrees counter-clockwise as viewing along −Z direction, as light beam B11 is transmitted from the second side 502 to the first side 501 of the magneto-optical crystal 50. The polarization direction D18 may be 45 degrees counter-clockwise from −X axis as viewing along −Z direction. The magneto-optical crystal 50 may be configured to rotate or change polarization direction D27 of light beam B12 to polarization direction D28, e.g., to rotate polarization direction of light beam B12 by 45 degrees counter-clockwise as viewing along −Z direction, as light beam B12 is transmitted from the second side 502 to the first side 501 of the magneto-optical crystal 50. The polarization direction D28 may be 45 degrees counter-clockwise from −X direction as viewing along −Z direction.

The wave plate 422 may be configured to rotate or change the polarization direction D18 of light beam B11 to polarization direction D19, as light beam B11 is transmitted from the second surface 402 to the first surface 401 of wave plate 422. The polarization direction D19 may be parallel to X axis. The polarization directions D18 and D19 may be symmetrical with respect to the optical axis A422 of wave plate 422. The wave plate 421 may be configured to rotate or change polarization direction D28 of light beam B12 to polarization direction D29, as light beam B12 is transmitted from the second surface 402 to the first surface 401 of wave plate 421. Polarization direction D29 may be parallel to Y axis, and polarization directions D28 and D29 may be symmetrical with respect to the optical axis A421. Further, polarization direction D29 of light beam B12 may be perpendicular to polarization direction D19 of light beam B11.

As polarization direction D29 of light beam B12 is perpendicular to polarization direction D19 of light beam B11, the walk-off crystal 30 may combine return light beams B11 and B12, and combined light beams B11 and B12 may be output via respective optical fiber core of port 2. Accordingly, a light beam input from port 1 is output via port 2 by the single-ended output circulator 100.

Figure 5A:
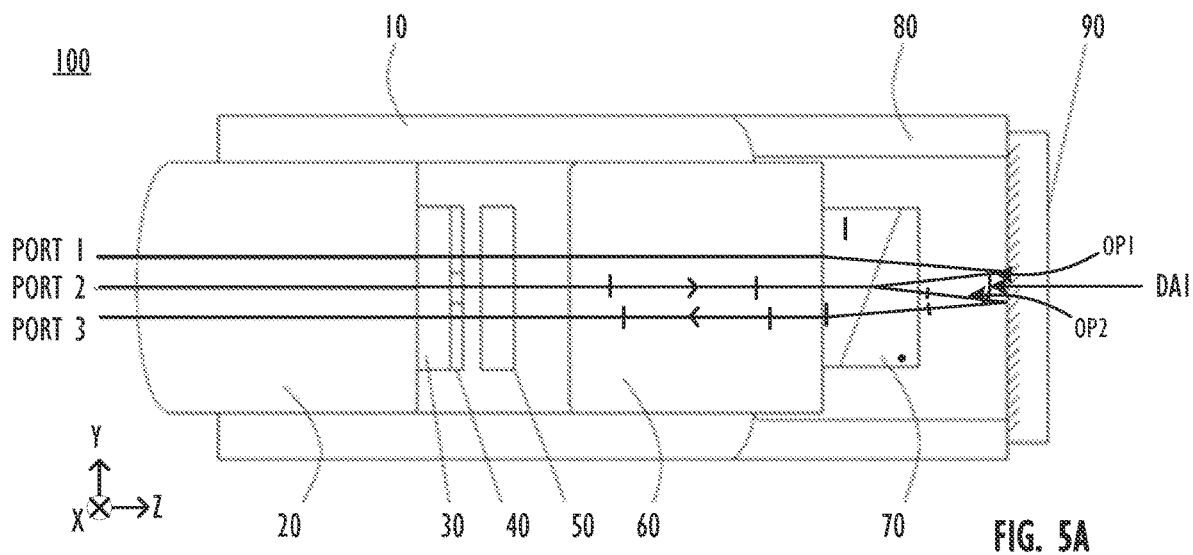
FIGS. 5A-5C illustrate an example of second optical paths of the single-ended output circulator shown in FIGS. 1A-1B from various viewing angles.
Figure 5B:
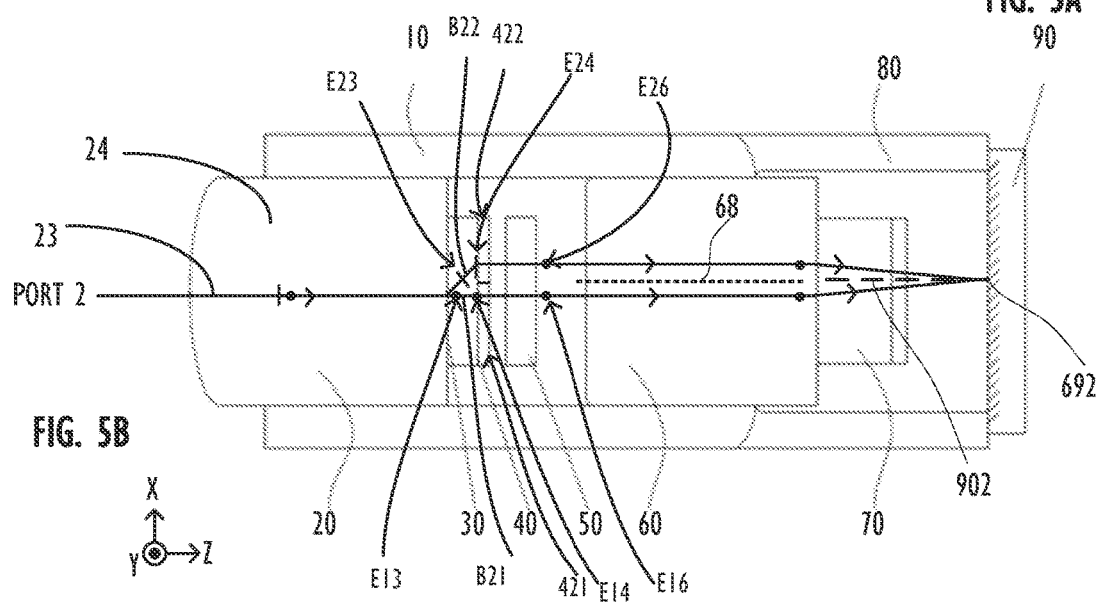
Figure 5C:
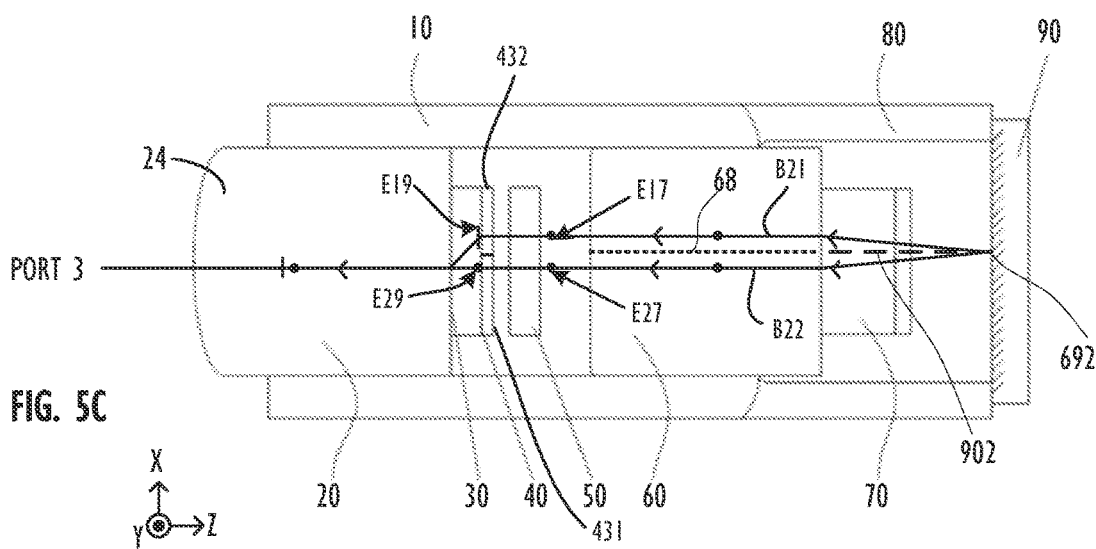

With reference to FIGS. 5A-5C and 3B, example light paths of a light beam input from port 2 and output from port 3 are described below. FIG. 5B illustrates light/optical paths of light beams from port 2 towards the reflection mirror 90; and FIG. 5C illustrates light/optical paths of reflected light beams from the reflection mirror 90 towards port 3. A light beam enters port 2 and is transmitted to the walk-off crystal 30 via an optical fiber core 23 corresponding to port 2. The light beam is split into light beam B21 (e.g., ordinary ray) having a polarization direction E13 that is parallel to Y axis and perpendicular to X-Z plane, denoted by a dot in FIG. 5B, and another light beam B22 (e.g., extraordinary ray) having a polarization direction E23 that is parallel to X-Z plane.

Upon entering the first surface 401 of wave plate 421 from the walk-off crystal 30, light beam B21 has a polarization direction E14 parallel to Y axis and perpendicular to X-Z plane. Upon entering the first surface 401 of wave plate 422 from the walk-off crystal 30, light beam B22 has a polarization direction E24 parallel to X axis and perpendicular to Y-Z plane. The wave plate 421 may be configured to rotate or change the polarization direction E14 of light beam B21 to polarization direction E15, as light beam B21 is transmitted from the first surface 401 to the second surface 402 of wave plate 421. The polarization direction E15 may be 45 degrees clockwise from −Y direction as viewing along −Z direction, and the polarization directions E14 and E15 may be symmetrical with respect to the optical axis A421.

The wave plate 422 may be configured to rotate or change polarization direction E24 to polarization direction E25, as light beam B22 is transmitted from the first surface 401 to the second surface 402 of wave plate 422. Polarization direction E25 may be 45 degrees clockwise from −Y direction as viewing along −Z direction, and polarization directions E24 and E25 may be symmetrical with respect to the optical axis A422. Further, polarization direction E25 of light beam B22 may be parallel to polarization direction E15 of light beam B21. The wave plates 421 and 422 may be configured to cause the polarization directions of light beams B21 and B22 to be same or parallel.

The magneto-optical crystal 50 may be configured to rotate or change polarization direction E15 of light beam B21 to polarization direction E16, e.g., to rotate polarization direction of light beam B21 by 45 degrees counter-clockwise as viewing along –Z direction, as light beam B21 is transmitted from the first side 501 to the second side 502 of the magneto-optical crystal 50. Polarization direction E15 may be parallel to Y axis. Further, the magneto-optical crystal 50 may be configured to rotate or change polarization direction E25 of light beam B22 to polarization direction E26, e.g., to rotate the polarization direction of light beam B22 by 45 degrees counter-clockwise as viewing along –Z direction, as light beam B22 travels from the first side 501 to the second side 502 of the magneto-optical crystal 50. Polarization direction E26 of light beam B22 may be parallel to Y axis, and be parallel to polarization direction E16 of light beam B21. The magneto-optical crystal 50 may be configured to cause the polarization directions of light beams B21 and B22 to be parallel to Y axis.

Further, light beams B21 and B22 from the magneto-optical crystal 50 may pass through the collimating lens 60. The collimating lens 60 may be configured to perform focusing and/or collimation on the light beams B21 and B22. The light beams B21 and B22 may pass through the optical prism 70, and further irradiate to the total reflection mirror 90 and be reflected by the total reflection mirror 90. Light beams B21 and B22 may be focused to a point 692 (e.g., a focus point of collimating lens 60) on the total reflection mirror 90. The total reflection mirror 90 may have a normal line 902 that is perpendicular to the reflection surface of the total reflection mirror 90. In certain examples, the total reflection mirror 90 (together with the second connecting tube 80) may be oriented, such that an angle between the normal line 902 and light beam B21 is equal to an angle between the normal line 902 and light beam B22 viewing along –Y direction, when the light beams B21 and B22 irradiate from the collimating lens 60 to the total reflection mirror 90. For example, an orthogonal projection of the normal line 902 on X-Z plane may bisect orthogonal projections of light beams B21 and B22 on X-Z plane, when the light beams B21 and B22 irradiate from the collimating lens 60 to the total reflection mirror 90.

In some examples, when the light beams B21 and B22 irradiate from the collimating lens 60 to the total reflection mirror 90, the central axis 68 of the collimating lens 60 may be between the light beams B21 and B22 along X axis. Further, the total reflection mirror 90 may be oriented, such that an angle between the normal line 902 and light beam B21 is equal to an angle between the normal line 902 and light beam B22 viewing along –Y direction, when the light beams B21 and B22 irradiate from the collimating lens 60 to the total reflection mirror 90. An orthogonal projection of the normal line 902 on the X-Z plane may be parallel to or tilted with respect to an orthogonal projection of the central axis 68 on the X-Z plane according to location relationships of the central axis 68 and the light beams B21 and B22.

In other examples, by arranging the locations of ports and optical fiber cores, the light beam B21 may irradiate to the total reflection mirror 90 in a path having the same X value as the central axis 68 of the collimating lens 60, and the total reflection mirror 90 may be tilted, such that an angle between the normal line 902 and light beam B21 is equal to an angle between the normal line 902 and light beam B22 viewing along –Y direction, when the light beams B21 and B22 irradiate from the collimating lens 60 to the total reflection mirror 90. The total reflection mirror 90 may be tilted by tiling or rotating the second connecting tube 80 around Y axis; and accordingly an orthogonal projection of the normal line 902 on the X-Z plane may be tilted with respect to an orthogonal projection of the central axis 68 on the X-Z plane.

The optical prism 70 may be configured to determine or tune a propagation direction of a light beam according to a polarization direction. For example, as the polarization directions of light beams B21 and B22 are different from the polarization directions of light beams B11 and B12, the optical prism 70 may cause light beams B11 and B12 to follow optical paths OP1 (see, e.g., FIG. 4A), and may cause light beams B21 and B22 to follow optical paths OP2 (see, e.g., FIG. 5A), where optical paths OP2 are different from optical paths OP1. Referring to FIG. 5A, the optical prism 70 may cause light beams B21 and B22 to transmit along propagation directions different from the propagation directions of reflected light beams B11 and B12 by a divergence angle DA1 (or a deviation angle) between optical paths OP1 and optical paths OP2. Accordingly, light beams B21 and B22 are output via port 3, instead of port 1.

The optical prism 70 may be configured to transmit light beams B11 and B12 reflected from the reflection mirror 90 along the first optical path OP1, according to the respective polarization directions of light beams B11 and B12; and the optical prism 70 may be configured to transmit the light beams B21 and B22 transmitted from the magneto-optical crystal 50 along the second optical path OP2, according to the polarization directions of light beams B21 and B22. The polarization directions of light beams B21 and B22 may be, for example, perpendicular to or approximately perpendicular to the polarization directions of light beams B11 and B12, when they are transmitted through the optical prism 70. For example, the polarization directions of light beams B21 and B22 may be perpendicular to or approximately perpendicular to X-Z plane, when light beams B21 and B22 is transmitted through the optical prism 70; and polarization directions of light beams B11 and B12 may be parallel to or approximately parallel to X-Z plane, when light beams B11 and B12 is transmitted through the optical prism 70.

The first optical path OP1 may correspond to that port 1 or the optical fiber core of port 1 receives the input light beam and that port 2 or the optical fiber core of port 2 outputs a respective output light beam of the input light beam. The second optical path OP2 may correspond to that port 2 or the optical fiber core of port 2 receives the input light beam and that port 3 or the optical fiber core of port 3 outputs a respective output light beam of the input light beam.

Via the optical prism 70, two separate optical paths OP1 and optical paths OP2 may be obtained, and a shifting distance between optical path OP1 and optical path OP2 may be obtained, such shift distance (e.g., along Y axis) may be relatively small, such as in a range of 125 micrometers to 250 micrometers. Accordingly, a distance between two adjacent optical fiber cores may be arranged to be in a range of 125 micrometers to 250 micrometers, and a distance between two adjacent ports may be arranged to be in a range of 125 micrometers to 250 micrometers.

Referring to FIGS. 5A, 5C, and 3B, reflected light beams B21 and B22 returns to the optical prism 70. As the light beams B21 and B22 are transmitted between the total reflection mirror 90 and the optical prism 70, the polarization directions of the light beams B21 and B22 may be parallel to Y-Z plane, and be perpendicular to the propagation directions of the light beams B21 and B22, respectively.

When passing through the collimating lens 60, light beams B21 and B22 may be collimated by the collimating lens 60, such that the propagation directions of light beams B21 and B22 may be parallel to each other and parallel to Z axis. Further, polarization direction E17 of the light beams B21 is parallel to polarization direction E27 of the light beam B22, and polarization directions E17 and E27 are parallel to Y axis.

The magneto-optical crystal 50 may be configured to rotate or change polarization direction E17 of light beam B21 to polarization direction E18, e.g., to rotate polarization direction of light beam B21 by 45 degrees counter-clockwise as viewing along −Z direction, as light beam B21 is transmitted from the second side 502 to the first side 501 of the magneto-optical crystal 50. The polarization direction E18 may be 45 degrees counter-clockwise from Y axis as viewing along −Z direction. The magneto-optical crystal 50 may be configured to rotate or change polarization direction E27 of light beam B22 to polarization direction E28, e.g., to rotate polarization direction of light beam B22 by 45 degrees counter-clockwise as viewing along −Z direction, as light beam B22 is transmitted from the second side 502 to the first side 501 of the magneto-optical crystal 50. The polarization direction E28 may be 45 degrees counter-clockwise from Y axis as viewing along −Z direction.

The wave plate 432 may be configured to rotate or change the polarization direction E18 of light beam B21 to polarization direction E19, as light beam B21 is transmitted from the second surface 402 to the first surface 401 of wave plate 432. The polarization direction E19 may be parallel to X axis. The polarization directions E18 and E19 may be symmetrical with respect to the optical axis A432 of wave plate 432. The wave plate 431 may be configured to rotate or change polarization direction E28 of light beam B22 to polarization direction E29, as light beam B22 is transmitted from the second surface 402 to the first surface 401 of wave plate 431. Polarization direction E29 may be parallel to Y axis, and polarization directions E28 and E29 may be symmetrical with respect to the optical axis A431. Further, polarization direction E29 of light beam B22 may be perpendicular to polarization direction E19 of light beam B21.

As polarization direction E29 of light beam B22 is perpendicular to polarization direction E19 of light beam B21, the walk-off crystal 30 may combine light beams B21 and B22, and combined light beams B21 and B22 may be output via respective optical fiber of port 3 and port 3. Accordingly, a light beam input from port 2 is output via port 3 by the single-ended output circulator 100.

In some examples, the optical prism may be a Wollaston prism, a Rochon prism, or a crystal wedge prism. In certain examples, the optical prism 70 (e.g., in FIGS. 1A-1B) may be a Wollaston prism or a Rochon prism, and may include a first prism 71 having a first optical axis A71 and a second prism having a second optical axis A72 that is perpendicular to the first optical axis A71. For example, the first optical axis A71 may be parallel to Y axis, and the second optical axis A72 may be parallel to X axis. In other example, the optical prism 70 (e.g., in FIG. 6) may be a crystal wedge prism that includes a birefringent crystal.

Figure 6:
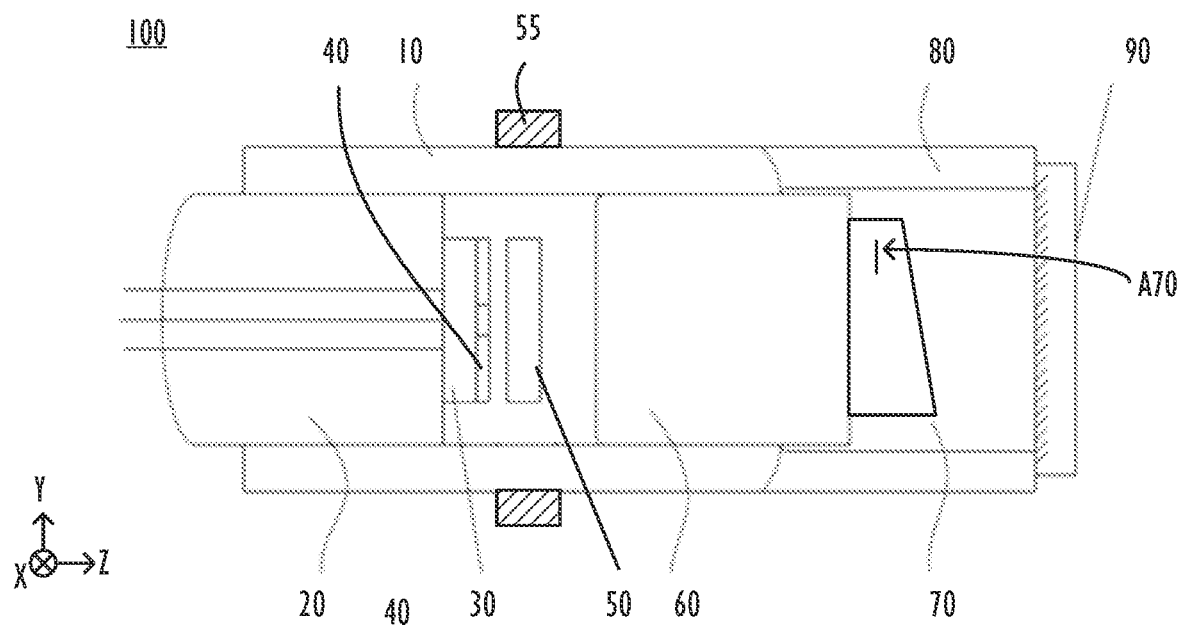
FIG. 6 is a side view of another single-ended output circulator having a magnetic ring fitted or disposed surrounding an outer circumference of a magneto-optical crystal according to the present disclosure.

In some examples, the magneto-optical crystal 50 may be a latching Faraday rotator. In other examples, such as the examples shown in FIG. 6 or 7, and the magneto-optical crystal 50 may also be a magneto-optical crystal provided with a magnetic ring (or magnetic tube) on or surrounding the circumference of the magneto-optical crystal to provide magnetic supply or magnetic field for the magneto-optical crystal. FIG. 6 shows that the magnetic ring 55 is arranged surrounding the magneto-optical crystal 50, and may surround portions of first connecting tube 10 that correspond to or surround to the magneto-optical crystal 50. Further, in the example of FIG. 6, the optical prism 70 is a crystal wedge prism that includes a birefringent crystal, and the crystal wedge prism has an optical axis A70 parallel to Y axis.

Figure 7:
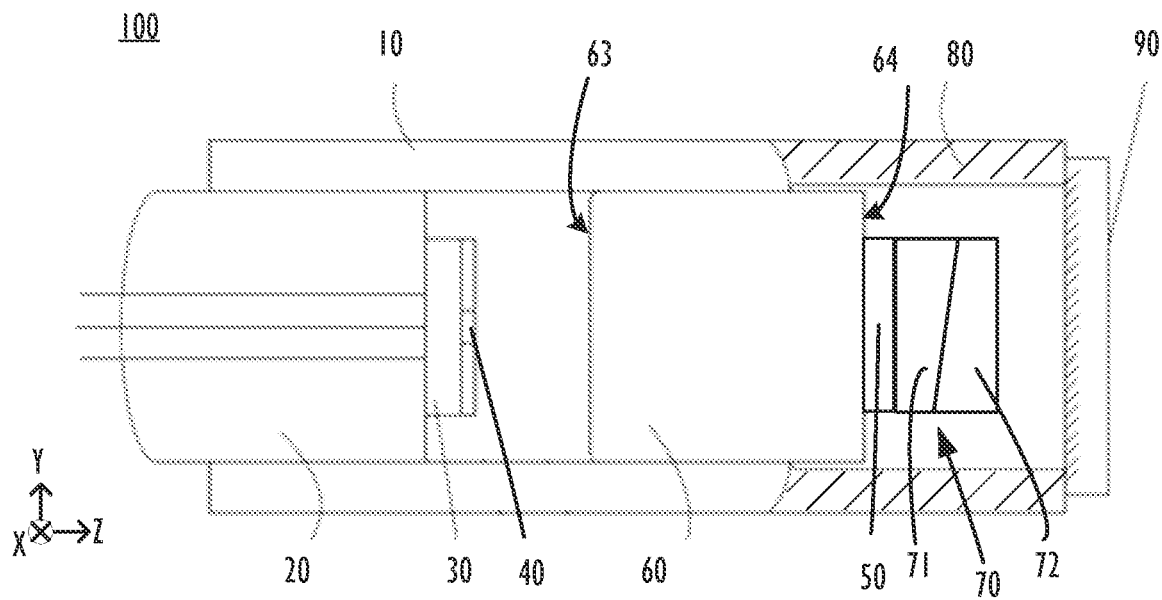
FIG. 7 is a side view of yet another single-ended output circulator having a second connecting tube being a magnetic ring or tube according to present disclosure.

FIG. 7 shows that the magneto-optical crystal 50 is disposed on the second side 64 of collimating lens 60 that is facing away from walk-off crystal 30, and the second connecting tube 80 is further configured as a magnetic ring or tube surrounding the magneto-optical crystal 50 to provide magnetic supply or magnetic field for the magneto-optical crystal to the magneto-optical crystal 50.

In certain examples, the optical prism 70 is attached to or in contact with the second end 62 of the collimating lens 60 (e.g., in FIGS. 1A-1B).

Further, in some examples, the three cores of the three-core optical fiber head 2 may be disposed or arranged side by side; and the walk-off crystal 30 and wave plates 40 may be sequentially attached to an end portion of three-core optical fiber head 20 (e.g., the second end 22 of three-core optical fiber head 20).

Figure 8:
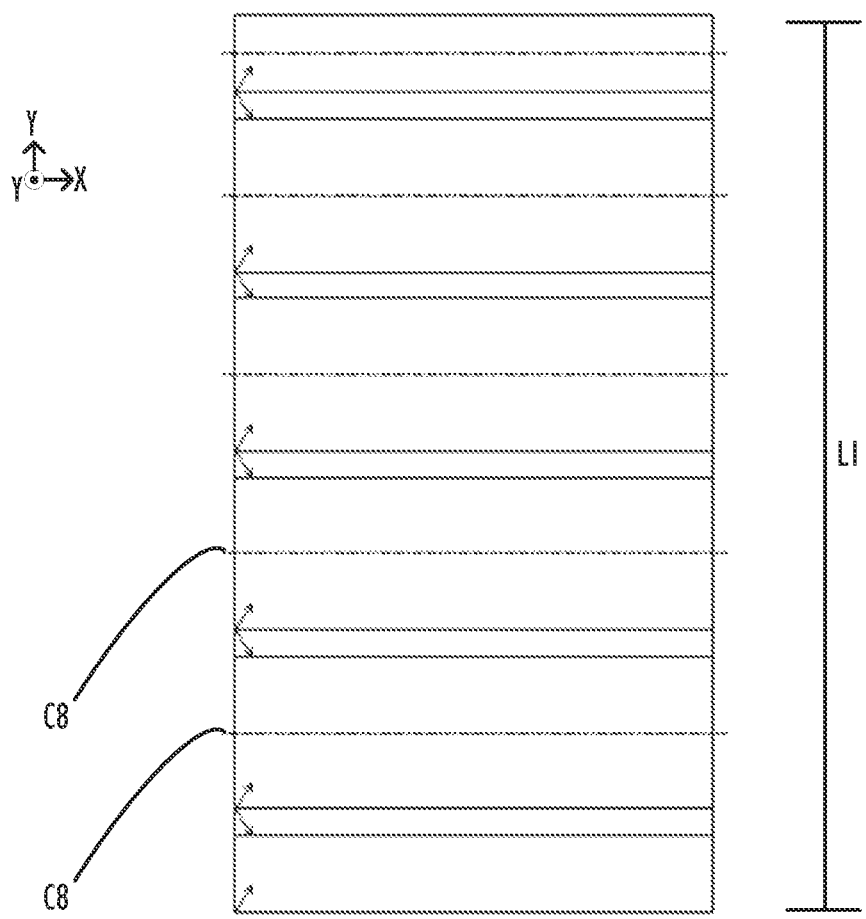
FIG. 8 is a first diagram of preparing a wave plate according to various embodiments of present disclosure.
Figure 9:
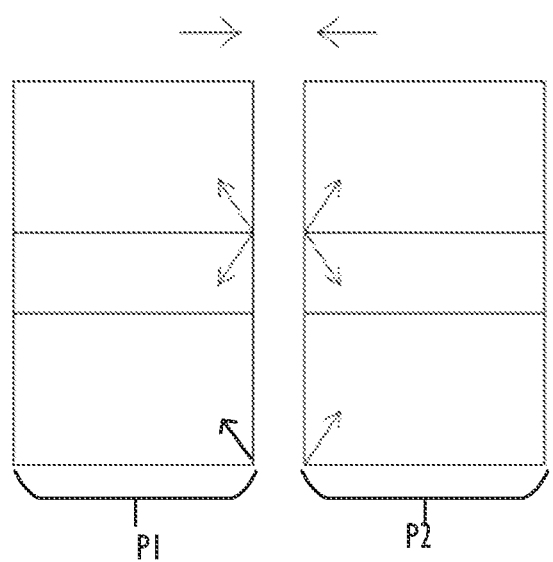
FIG. 9 is a second diagram of preparing a wave plate according to various embodiments of preset disclosure.

With reference to FIGS. 8 and 9, in some embodiments, the wave plates 40 may include a three-piece structure, and may be formed by, e.g., gluing multiple optical plates to a corresponding or preset dimension L1, e.g., the width or length along Y axis shown in FIG. 8, via optical adhesives, deepen optical adhesives, or a glue with a compatible light conductivity, and further cutting glued multiple optical plates by a slicer according to a preset size configuration, e.g., along dashed lines C8. Thus, attaching the wave plates 40 to the walk-off crystal may be performed together or in a single step, without the need to separately attach each of the wave plates 40 to the walk-off crystal. Referring to FIG. 9, for smaller parts P1 and P2 after cutting glued multiple optical plates, smaller parts P1 and P2 may be integrated or attached to each other side by side by gluing, so as to form the wave plates 40 shown in FIG. 2B. The method has low processing cost and facilitates the assembly and processing of the circulator.

In the present disclosure, the three-core optical fiber head 20, the walk-off crystal 30, the wave plates 40, the magneto-optical crystal 50, the collimating lens 60, and the optical prism 70, can be on a same side of the reflection mirror; and can be packaged in the first connecting tube 10 and the second connecting tube 80, so as to reduce the device size.

The above-described embodiments are merely some of embodiments of the present disclosure, rather than all the embodiments of the present disclosure. The accompanying drawings show example embodiments of the present invention, but do not limit the scope of the present disclosure. The present invention can be implemented in many different forms. Any equivalent designs or structures made by using the contents of the specification and accompanying drawings of the present disclosure, directly or indirectly applied to other related technical fields, fall within the scope of the present invention.

What is claimed is:

1. An optical circulator for routing a light beam, the optical circulator comprising:
   first, second, and third optical ports disposed at a first end of the optical circulator and configured to transmit the light beam;
   a birefringent crystal disposed in optical communication with the first, second, and third optical ports and configured to refract the light beam based on a polarization direction and a propagation direction;

a plurality of half-wave plates disposed in optical communication with the birefringent crystal, each of the half-wave plates configured to shift the polarization direction of the light beam passing therethrough;

an optical prism disposed in optical communication with the half-wave plates and configured to transmit the light beam along the propagation direction according to the polarization direction of the light beam;

a reflector disposed at a second end of the optical circulator and disposed in optical communication with the optical prism, the reflector configured to reflect the light beam incident thereto back to the optical prism;

a polarization rotator disposed in optical communication at least between the plurality of half-wave plates and the optical prism and configured to rotate the polarization direction of the light beam; and a housing comprising a first connecting tube having a first spherical end surface and a second connecting tube having a second spherical end surface matching the first spherical end surface of the first connecting tube, wherein the housing includes the first, second, and third optical ports, the birefringent crystal, the half-wave plates, the optical prism, the polarization rotator, and the reflector.

2. The optical circulator of claim 1, further comprising a collimating lens disposed in optical communication between the polarization rotator and the optical prism.

3. The optical circulator of claim 1, wherein each of the first, second, and third optical ports comprises a fiber core.

4. The optical circulator of claim 1, wherein the optical circulator is configured to:
receive, via the first optical port, a first input of the light beam, and output, via the second optical port, a first output of light beam corresponding to the first input of the light beam; and
receive, via the second optical port, a second input of the light beam, and output, via the third optical port, a second output of light beam corresponding to the second input of the light beam.

5. The optical circulator of claim 1, wherein:
the first optical port is configured to receive a first input of the light beam;
the birefringent crystal is configured to split the first input of the light beam into a first split light beam having a first of the polarization direction and a second split light beam having a second of the polarization direction;
at a surface of the birefringent crystal opposite the first optical port, the first of the polarization direction is along a first axis direction, and the second of the polarization direction is along a second axis direction that is perpendicular to the first axis direction;
the plurality of half-wave plates are configured to rotate the first of the polarization direction and the second of the polarization direction to a first orientation;
the polarization rotator is configured to rotate the first of the polarization direction and the second of the polarization direction to the first axis direction; and
the optical prism is configured to transmit the first split light beam and the second split light beam reflected from the reflector along a first optical path, according to the first of the polarization direction and the second of the polarization direction.

6. The optical circulator of claim 5, wherein:
the second optical port is configured to receive a second input of the light beam;
the birefringent crystal is configured to split the second input of the light beam into a third split light beam having a third of the polarization direction and a fourth split light beam having a fourth of the polarization direction;

at the surface of the birefringent crystal, the third of the polarization direction is along the first axis direction, and the fourth of the polarization direction is along the second axis direction perpendicular to the first axis direction;

the plurality of half-wave plates are configured to rotate the third of the polarization direction and the fourth of the polarization direction to a second orientation;

the polarization rotator is configured to rotate the third of the polarization direction and the fourth of the polarization direction to the second axis direction; and the optical prism is configured to transmit the third split light beam and the fourth split light beam from the polarization rotator along a second optical path, according to the third of the polarization direction and the fourth of the polarization direction.

7. The optical circulator of claim 1, wherein the second spherical end surface of the second connecting tube is configured to be adjustable with the first spherical end surface of the first connecting tube to orient the reflector.

8. The optical circulator of claim 1, further comprising a magnetic ring surrounding a circumference of the polarization rotator.

9. A single-ended output circulator, comprising:
a first connecting tube comprising a first end and a second end, the second end having a spherical end surface;
a second connecting tube having a first end having a spherical end surface adjustably matched with the spherical end surface of the first connecting tube;
a three-core optical fiber head having a first optical fiber core, a second optical fiber core, a third optical fiber core, a first end, and a second opposing end;
a walk-off crystal having a first surface facing towards the second end of the three-core optical fiber head and a second surface facing away from the second end of the three-core optical fiber head;
a plurality of half-wave plates each having a first surface coupled to the second surface of the walk-off crystal and a second surface facing away from the second surface of the walk-off crystal;
a collimating lens having a first end facing towards the plurality of half-wave plates and a second end facing away from the plurality of half-wave plates;
a reflection mirror facing towards the second end of the collimating lens and configured to reflect a light beam from the collimating lens;
an optical prism between the collimating lens and the reflection mirror and configured to transmit the light beam along a propagation direction according to a polarization direction of the light beam; and
a polarization rotator disposed between the plurality of half-wave plates and the collimating lens,
wherein the second end of the three-core optical fiber head penetrates into the first end of the first connecting tube, and
wherein the first end of the collimating lens penetrates into the second end of the first connecting tube.

10. The single-ended output circulator of claim 9, wherein:
the second connecting tube has a second end opposite the first end of the second connecting tube, and
the reflection mirror is attached to the second end of the second connecting tube.

11. The single-ended output circulator of claim 9, wherein
a cross-section of the first connecting tube has an annular shape, and a cross-section of the second connecting tube has an annular shape and
wherein the first connecting tube and the second connecting tube are approximately coaxial.

12. The single-ended output circulator of claim 9, wherein the single-ended output circulator is configured to:
receive, via the first optical fiber core, a first input light beam, and output, via the second optical fiber core, a first output light beam corresponding to the first input light beam; and
receive, via the second optical fiber core, a second input light beam, and output, via the third optical fiber core, a second output light beam corresponding to the second input light beam.

13. The single-ended output circulator of claim 9, wherein:
the first optical fiber core is configured to receive a first input of the light beam;
the walk-off crystal is configured to split the first input of the light beam into a first split light beam having a first of the polarization direction and a second split light beam having a second of the polarization direction;
at the second surface of the walk-off crystal, the first of the polarization direction is along a first axis direction, and the second of the polarization direction is along a second axis direction that is perpendicular to the first axis direction;
the plurality of half-wave plates are configured to rotate the first of the polarization direction of the first split light beam and the second of the polarization direction of the second split light beam from the walk-off crystal to a first orientation;
the polarization rotator is configured to rotate the first of the polarization direction of the first split light beam and the second of the polarization direction of the second split light beam to the first axis direction; and
the optical prism is configured to transmit the first split light beam and the second split light beam reflected from the reflection mirror along a first optical path, according to the first of the polarization direction and the second of the polarization direction.

14. The single-ended output circulator of claim 13, wherein:
the second optical fiber core is configured to receive a second input of the light beam;
the walk-off crystal is configured to split the second input of the light beam into a third split light beam having a third of the polarization direction and a fourth split light beam having a fourth of the polarization direction;
at the second surface of the walk-off crystal, the third of the polarization direction is along the first axis direction, and the fourth of the polarization direction is along the second axis direction that is perpendicular to the first axis direction;
the plurality of half-wave plates are configured to rotate the third of the polarization direction of the third split light beam and the fourth of the polarization direction of the fourth split light beam from the walk-off crystal to a second orientation;
the polarization rotator is configured to rotate the third of the polarization direction of the third split light beam and the fourth of the polarization direction of the fourth split light beam to the second axis direction; and
the optical prism is configured to transmit the third split light beam and the fourth split light beam from the polarization rotator along a second optical path, according to the third of the polarization direction and the fourth of the polarization direction.

15. The single-ended output circulator of claim 14, wherein:
the first optical path corresponds to the first optical fiber core configured to receive the first input of the light beam and the second optical fiber core configured to output a respective first output light beam of the first input of the light beam; and
the second optical path corresponds to the second optical fiber core configured to receive the second input of the light beam and the third optical fiber core configured to output a respective second output light beam of the second input of the light beam.

16. The single-ended output circulator of claim 13, wherein:
a first half-wave plate of the plurality of half-wave plates is configured to rotate the first of the polarization direction of the first split light beam from the walk-off crystal to the first orientation, and
a second half-wave plate of the plurality of half-wave plates is configured to rotate the second of the polarization direction of the second split light beam to the first orientation.

17. The single-ended output circulator of claim 16, wherein at least one of:
(i) the first half-wave plate of the plurality of half-wave plates has an optical axis that is 22.5 degrees from the second axis direction along a first rotation direction, and the second half-wave plate of the plurality of half-wave plates has an optical axis that is 22.5 degrees from the second axis direction along a second rotation direction that is opposite the first rotation direction; and
(ii) the first rotation direction is counter-clockwise and second rotation direction is clockwise.

18. The single-ended output circulator of claim 9, wherein at least one of:
(i) the optical prism is a Wollaston prism, a Rochon prism, or a crystal wedge prism;
(ii) the polarization rotator includes a magneto-optical crystal with a magnetic ring surrounding the magneto-optical crystal; and
(iii) the three-core optical fiber head, the walk-off crystal, the plurality of half-wave plates, the collimating lens, the optical prism, and the polarization rotator are on a same side of the reflection mirror.

19. The single-ended output circulator of claim 9, wherein the first optical fiber core, the second optical fiber core, the third optical fiber core are disposed side by side.

20. The single-ended output circulator of claim 19, wherein:
the second optical fiber core is disposed between the first optical fiber core and the third optical fiber core; and
a distance between the first optical fiber core and the second optical fiber core is in a range of 125 micrometers to 250 micrometers.

21. The single-ended output circulator of claim 20, further comprising:
a first port coupled to the first optical fiber core;
a second port coupled to the second optical fiber core; and
a third port coupled to the third optical fiber core,
wherein a distance between the first port and the second port is in a range of 125 micrometers to 250 micrometers.

* * * * *